United States Patent
Mizutani et al.

(10) Patent No.: US 11,198,914 B2
(45) Date of Patent: Dec. 14, 2021

(54) RAW MATERIAL FOR DIRECT REDUCTION, METHOD OF PRODUCING RAW MATERIAL FOR DIRECT REDUCTION, AND METHOD OF PRODUCING REDUCED IRON

(71) Applicant: NIPPON STEEL CORPORATION, Tokyo (JP)

(72) Inventors: Moritoshi Mizutani, Kimitsu (JP); Tsunehisa Nishimura, Sodegaura (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/834,510

(22) Filed: Mar. 30, 2020

(65) Prior Publication Data

US 2020/0224285 A1    Jul. 16, 2020

Related U.S. Application Data (62) Division of application No. 14/907,169, filed as application No. PCT/JP2014/069683 on Jul. 25, 2014, now abandoned.

(30) Foreign Application Priority Data

Jul. 29, 2013  (JP) .................................. 2013-156408
Apr. 24, 2014  (JP) .................................. 2014-090491

(51) Int. Cl.
  *C21B 13/02*  (2006.01)
  *C22B 1/16*  (2006.01)
  *C21B 13/00*  (2006.01)

(52) U.S. Cl.
  CPC .......... *C21B 13/02* (2013.01); *C21B 13/0046* (2013.01); *C22B 1/16* (2013.01); *Y02P 10/134* (2015.11)

(58) Field of Classification Search
  CPC ...... C21B 13/0046; C22B 1/16; Y02P 10/134
  USPC ........................................... 75/489
  See application file for complete search history.

(56) References Cited

U.S. PATENT DOCUMENTS

| 3,153,686 A | 10/1964 | Wienert et al. |
| 3,690,930 A * | 9/1972 | Mueller et al. ....... B22F 1/0059 427/216 |
| 4,257,806 A | 3/1981 | Fujita et al. |
| 4,350,523 A | 9/1982 | Taguchi et al. |
| 4,388,116 A | 6/1983 | Carrillo-Cantu et al. |

(Continued)

FOREIGN PATENT DOCUMENTS

| CN | 102321799 A | 1/2012 |
| EP | 0207779 A | 1/1987 |

(Continued)

OTHER PUBLICATIONS

Chinese Office Action and Search Report, dated Nov. 28, 2016, for Chinese Application No. 201480041537.0, with an English translation.

(Continued)

*Primary Examiner* — Jie Yang (74) *Attorney, Agent, or Firm* — Birch, Stewart, Kolasch & Birch, LLP (57) ABSTRACT

A raw material for direct reduction which is reduced in a shaft furnace includes a raw material, and a coating layer which coats the raw material and has a porosity of 20 volume % or more.

3 Claims, 4 Drawing Sheets

(56) References Cited

U.S. PATENT DOCUMENTS

| | | | |
|---|---|---|---|
| 5,127,940 | A | 7/1992 | Sugiyama et al. |
| 5,181,954 | A | 1/1993 | Berrun-Castanon et al. |
| 6,332,912 | B1 | 12/2001 | Klemo |
| 7,674,443 | B1 | 3/2010 | Davis |
| 2002/0005089 | A1 | 1/2002 | Nagata et al. |
| 2007/0186723 | A1 | 8/2007 | Mourao et al. |
| 2009/0175753 | A1 | 7/2009 | Iwasaki et al. |
| 2014/0096650 | A1 | 4/2014 | Botelho et al. |
| 2016/0186290 | A1 | 6/2016 | Hitchings et al. |

FOREIGN PATENT DOCUMENTS

| | | | | |
|---|---|---|---|---|
| EP | 0207779 | A2 * | 1/1987 | ............... C23C 4/04 |
| EP | 011973 | B1 | 6/2009 | |
| JP | 59-010411 | A | 3/1984 | |
| JP | 61-253309 | A | 11/1986 | |
| JP | 63-262426 | A | 10/1988 | |
| JP | 05-156335 | A | 8/1993 | |
| JP | 2002-363625 | A | 12/2002 | |
| JP | 2012-102371 | A | 5/2012 | |
| RU | 2173721 | C1 | 9/2001 | |
| RU | 2202632 | C1 | 4/2003 | |

OTHER PUBLICATIONS

Indian Office Action dated Jul. 5, 2019, for Indian Application No. 10709/DELNP/2015, with English translation.
Russian Office Action and Search Report, dated Apr. 5, 2017, for Russian Application No. 2016101528, with an English translation.
Shen et al., "Study on.sponge iron prepared by carbon-containing pellets based on coating protection," Electroplating & Finishing, vol. 32, No. 6, pp. 51-56, Jun. 30, 2013, with an English abstract.
Advisory Action dated May 2, 2010, issued in U.S. Appl. No. 14/907,169.
ASTM—Designation: C150/C150M—17 Standard Specification for Portland Cement, 2018.
Final office Action dated Aug. 24, 2017 in U.S. Appl. No. 14/907,169.
Final Office Action dated Dec. 31, 2018 in U.S. Appl. No. 14/907,169.
Final Office Action dated Nov. 29, 2019 in U.S. Appl. No. 14/907,169.
Hayashi et al., Influence of Coating Oxide and Sulfur Pressure on Sticking during Fluidized Bed Reduction of Iron Ores, ISIJ International/ vol. 33, Issue 10, pp. 1078-1087 (1993).
International Search Report dated Oct. 28, 2014 issued in International Application No. PCT/JP/2014/069683.
Komatin & Gudenau, The Sticking Problem During Direct Reduction of Fine Iron Ore in the Fluidized Bed, Metalurgija—Journal of Metallurgy, 2004.
Non-Final Office Action dated Jan. 12, 2017 for U.S. Appl. No. 14/907,169.
Non-Final Office Action dated Mar. 27, 2018 for U.S. Appl. No. 14/907,169.
Pre-Brief Appeal Conference Decision dated Aug. 22, 2019, issued in U.S. Appl. No. 14/907,169.
Rudramuniyappa et al., Studies on composite pre-reduced pellets of iron ore fines of Sandur area, Bellary district, Karnataka, India, 2000.
Zhong et al., Prevention of agglomeration/defluidization in fluidized bed reduction of Fe2O3 by CO: The role of magnesium and calcium-oxide, Powder Tech. 241 (2013), pp. 142-148.

* cited by examiner

RAW MATERIAL FOR DIRECT REDUCTION, METHOD OF PRODUCING RAW MATERIAL FOR DIRECT REDUCTION, AND METHOD OF PRODUCING REDUCED IRON

This application is a Divisional of U.S. application Ser. No. 14/907,169, filed Jan. 22, 2016, which is the National Phase of PCT/International Application No. PCT/JP2014/069683, filed Jul. 25, 2014, which claims priority under 35 U.S.C. 119(a) to Japanese Patent Application No. 2013-156408, filed on Jul. 29, 2013 and Japanese Patent Application No. 2014-090491, filed on Apr. 24, 2014, each of which is incorporated herein by reference, in its entirety.

TECHNICAL FIELD OF THE INVENTION

The present invention relates to a raw material for direct reduction, a method of producing a raw material for direct reduction, and a method of producing reduced iron.

BACKGROUND ART

As an iron-making method of reducing iron from a raw material containing iron oxide, a direct reduction process for producing reduced iron has been known. The direct reduction process has been developed in the background of low construction costs of plants to perform the direct reduction process, easy operation, and operability even in a small scale plant. Particularly, a shaft-type direct reduction furnace has been variously improved to effectively utilize reduction gas in the furnace.

In order to perform a stable operation using the direct reduction process, stabilizing the gas flow and the solid flow are important technical problems. When the iron oxide raw material is clustered in a high temperature zone in the lower part of the shaft furnace, ventilation resistance increases and productivity in a shaft furnace is deteriorated. Also, poor descent of the iron oxide raw material occurs and the production is impeded. Accordingly, in the direct reduction process, the clustering index of the iron oxide raw material is managed in many cases. For example, a value that can be obtained from a test according to ISO 11256:2007 (hereinafter, also referred to as an "ISO test") is set to as the clustering index.

It has been known that a clustering phenomenon occurs due to solid phase sintering of metal iron, entanglement of beardlike metal iron, or melting and adhering by formation of a low melting point slug on the surface layer of an iron oxide raw material. As a technique of preventing clustering, it has been known that it is effective to coat an iron oxide raw material with a carbon material, cement, magnesium hydroxide and the like (for example, refer to Patent Documents 1 to 3).

CITATION LIST

Patent Document

[Patent Document 1] Japanese Unexamined Patent Application, First Publication No. S61-253309
[Patent Document 2] Japanese Unexamined Patent Application, First Publication No. H5-156335
[Patent Document 3] European Patent Application, Publication No. 0207779
[Patent Document 4] Japanese Unexamined Patent Application, First Publication No. 2012-102371
[Patent Document 5] Japanese Examined Patent Application, Second Publication No. S59-10411

SUMMARY OF THE INVENTION

Problems to be Solved by the Invention

However, as described in Patent Documents 1 to 3, even when a raw material is coated with cement or the like, charged into a shaft furnace as it is, and reduced, there is a concern of reduction disintegration occurring. The reasons will be described later.

In Patent Document 4, a technique of improving productivity by charging a preheated iron oxide raw material into a shaft furnace and reducing the raw material is disclosed. However, preferable production conditions and methods for preventing clustering and reduction disintegration are not disclosed. Accordingly, clustering and reduction disintegration cannot be reliably prevented in the technique disclosed in Patent Document 4.

In Patent Document 5, a technique of forming a porous surface texture by coating a raw material is disclosed. However, specific requirements for a preferable porous state for preventing clustering and reduction disintegration, and production conditions and methods for satisfying the requirements are not disclosed. In addition, there is no mention about coating layer densification by carbonation of a coating layer, or deterioration in reduction disintegration resistance. Accordingly, clustering and reduction disintegration cannot be reliably prevented in the technique disclosed in Patent Document 5.

The present invention is made in consideration of the above circumstances and an object thereof is to provide a raw material for direct reduction in which clustering and reduction disintegration are less likely to occur, a method of producing the raw material for direct reduction, and a method of producing reduced iron.

Means for Solving the Problem

In order to solve the above problems, the present invention has adopted the following aspects.

(1) A raw material for direct reduction which is reduced in a shaft furnace includes: a raw material; and a coating layer which coats the raw material and has a porosity of 20 volume % or more.

(2) In the configuration according to the above (1), the coating layer may include at least one of an oxide of Ca and an oxide of Mg.

(3) A method of producing a raw material for direct reduction which is reduced in a shaft furnace includes: coating a raw material with a slurry containing at least one of calcium hydroxide, magnesium hydroxide, and cement hydrate; evaporating moisture included in the coated raw material using gas not including $CO_2$ before charging the coated raw material into the shaft furnace; and dehydrating combined water included in the coated raw material at a dehydration temperature or higher using gas not including $H_2O$ steam.

(4) In the method of producing a raw material for direct reduction according to the above (3), in the coating, the raw material may be coated with the slurry using an immersion method or a spraying method.

(5) A method of producing a reduced iron includes charging the coated raw material produced by the method according to the above (3) or (4) into the shaft furnace at a temperature higher than room temperature, in which the shaft furnace is a reduction furnace for producing reduced iron using reduction gas including hydrogen.

(6) The method of producing a reduced iron according to the above (5) may further include preheating the coated raw material to the temperature higher than room temperature before charging the coated raw material into the shaft furnace.

Effects of the Invention

According to the above aspects, it is possible to provide a raw material for direct reduction in which clustering and reduction disintegration are less likely to occur. According to the raw material for direct reduction, the stable operation of a direct reduction process can be performed. In addition, since an iron oxide raw material in which reduction disintegration is likely to occur, which could not be used in a direct reduction process of the related art, can be used in the direct reduction process, a selection range of iron oxide raw materials that can be used in the direct reduction process can be widened and flexibility for selecting a raw material is increased.

EMBODIMENTS OF THE INVENTION (Outline of Direct Reduction Iron-Making Method)

Figure 1:
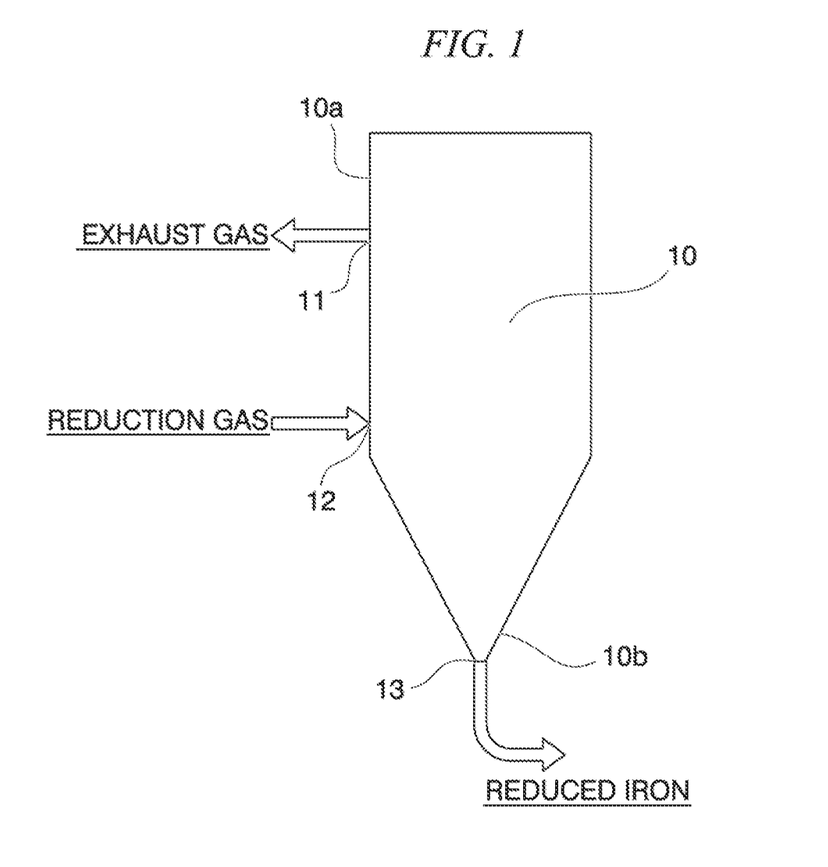
FIG. 1 is a schematic configuration view of a vertical shaft furnace.

FIG. 1 is a schematic configuration view of a shaft furnace 10 for reducing a raw material for direct reduction according to an embodiment of the present invention (hereinafter, also referred to as a raw material). The shaft furnace 10 is a vertical shaft furnace and includes a gas outlet 11, a gas inlet 12, and a reduced iron outlet 13, and a so-called direct reduction process (MIDREX) is used to reduce a raw material. The gas inlet 12 is provided approximately at the middle stage position in the vertical direction of the shaft furnace 10 and injects a reduction gas into the shaft furnace 10. As the reduction gas, natural gas, reformed gas obtained by reforming natural gas and mainly containing CO and $H_2$, and coal gas can be used. The coal gas is a gas that is generated when coal is gasified. In the composition of the reformed gas used as the reduction gas, the total concentration of $H_2$ and CO may be about 90 mol % and the molar ratio of $H_2/(H_2+CO)$ may be 0.52 to 0.71, and the concentration of $CO_2$ may be 0.5 mol % to 3.0 mol %. The temperature of the reduction gas may be 700° C. to 1000° C.

The reduction gas reduces the raw material that is charged from the top of the shaft furnace 10, and then is exhausted from the gas outlet 11 installed at the furnace top 10a as exhaust gas. The reduced raw material, that is, reduced iron is cooled by cooling gas (not shown) circulating in a bottom of furnace 10b and then discharged from the reduced iron outlet 13 installed at the bottom of furnace 10b.

Here, as a method for preventing clustering of the raw material in the furnace, a method of reducing the compressive stress in the bottom of furnace 10b by providing a burden feeder in the bottom of the furnace 10b and setting a flow of the iron oxide raw material to a shearing flow can be considered. Also, a method of providing a clustering breaker in the bottom of the furnace 10b and mechanically destroying the formed clusters can be considered. However, since the amount of fine powder generated in the shaft furnace 10 increases in these methods, there are concerns that the gas flow, the solid flow, or the like is deteriorated and the amount of dust discharged to the outside of the system increases.

In addition, a method of coating a raw material with a coating layer also has been performed in the related art. Since the mutual adhesion of metal iron particles between a raw material and another raw material is suppressed by coating the raw material with a coating layer, clustering is less likely to occur. When a raw material is coated with a coating layer, clustering is suppressed. Thus, it is possible to prevent a large amount of fine powder from being generated in the shaft furnace 10.

Technical Problems

However, it has been found that the reduction of the iron oxide raw material coated with the coating layer in the shaft furnace 10 as it is, cause further disintegration. The present inventors have conducted intensive investigations on the causes thereof and ascertained that the structure of the coating layer causes the promotion of reduction disintegration. That is, since the structure of the coating layer is dense, the diffusion of reduction gas is not uniform and the reduction reaction pattern is non-topochemical. Therefore, reduction disintegration is promoted. Based on the findings, a raw material for direct reduction in which reduction disintegration can be suppressed while suppressing clustering by providing a sufficient porosity to the coating layer in advance has been developed.

Raw Material for Direct Reduction of Embodiment

Figure 2:
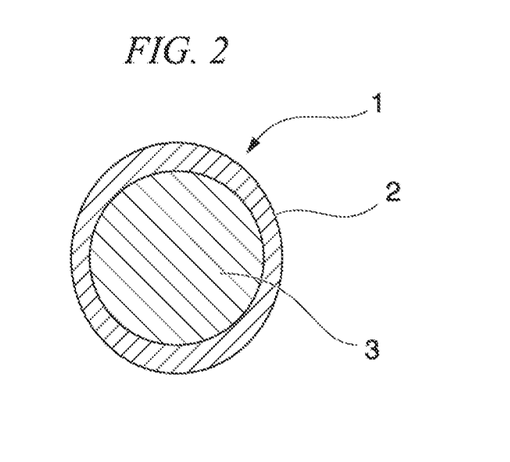
FIG. 2 is a schematic sectional view of a porously coated raw material.

Next, while referring to FIG. 2, a raw material provided with the above-described coating layer to which porosity is provided (hereinafter, also referred to as a porously coated raw material) will be described. A porously coated raw material 1 has a raw material 3 and a coating layer 2 with which the raw material 3 is coated. The average value of the porosity of the coating layer 2 is 20 volume % or more and 50 volume % or less. When the porosity is more than 50 volume %, the coating layer 2 disbands from the raw material 3 and cannot maintain the inherent function of coating the raw material 3. Thus, the upper limit of the porosity is preferably 50 volume %. Further, in the current method of producing the coating layer (spraying method or immersion method), it is difficult to form the coating layer 2 in which a porosity of 50 volume % or more is secured.

Since the entire periphery of the raw material 3 is coated with the coating layer 2, the mutual adhesion of metal particles between the raw material and another raw material during reduction can be suppressed. Thus, clustering can be suppressed. As the raw material 3, iron ore mainly containing $Fe_2O_3$ and a processed product thereof can be used. As the processed product, iron ore lump, sinter, pellet or briquette obtained by agglomerating iron ore fine can be used.

When the porously coated raw material 1 provided with the coating layer 2 is charged into the shaft furnace 10, the reduction gas diffuses into the raw material 3 while passing through the pore in the coating layer 2. Thus, the reaction mode of reduction with topochemical can suppress the reduction disintegration of the raw material 3. When the porosity of the porous structure is less than 20 volume %, the diffusion distribution of the reduction gas in the raw material 3 is not uniform and the reduction reaction mode is non-topochemical. Thus, the reduction disintegration of the raw material 3 cannot be suppressed. The porosity of the coating layer 2 can be measured by imaging the coating layer 2 and analyzing the image data.

As the coating layer 2, at least one of an oxide of Ca, an oxide of Mg, and a mixture mainly containing at least one of an oxide of Ca and an oxide of Mg can be used. That is, the coating layer 2 can be formed by using any of only an oxide of Ca, only an oxide of Mg, only a mixture of both an oxide of Ca and an oxide of Mg, a mixture mainly containing an oxide of Ca, a mixture mainly containing an oxide of Mg, and a mixture mainly containing both an oxide of Ca and an oxide of Mg.

In addition, it is preferable that the coating layer 2 does not include hydroxide when the raw material is charged into the shaft furnace 10. The reason will be described later.

A person skilled in the art can appropriately select the layer amount of the coating layer 2 from the viewpoint of suppressing clustering and reduction disintegration. That is, when the layer amount of the coating layer 2 is excessively small, clustering cannot be prevented. On the other hand, when the layer amount of the coating layer 2 is excessively large, the diffusion of reduction gas into the raw material 3 is suppressed and reducibility and reduction disintegration resistance are deteriorated. The layer amount of the coating layer 2 is, for example, preferably 0.5 kg/t to 10.0 kg/t when the layer amount is expressed as a value obtained by dividing the layer amount by the mass of the raw material 3. That is, the layer amount of the coating layer 2 per t of raw material 3 is preferably 0.5 kg to 10.0 kg. The layer amount can be measured from a change in mass before and after coating (that is, the mass obtained by subtracting the mass of the raw material 3 before coating from the mass of the porously coated raw material 1 after coating is the layer mass).

When the above-described porously coated raw material 1 is used as a raw material for direct reduction, clustering and reduction disintegration are less likely to occur. That is, when the porously coated raw material 1 of the embodiment is used as a raw material for direct reduction, a permeability of the reduction gas or the like can be prevented, that is, the reduction gas can be prevented from not reaching the raw material 3, and reduced iron can be stably produced.

Figure 3:
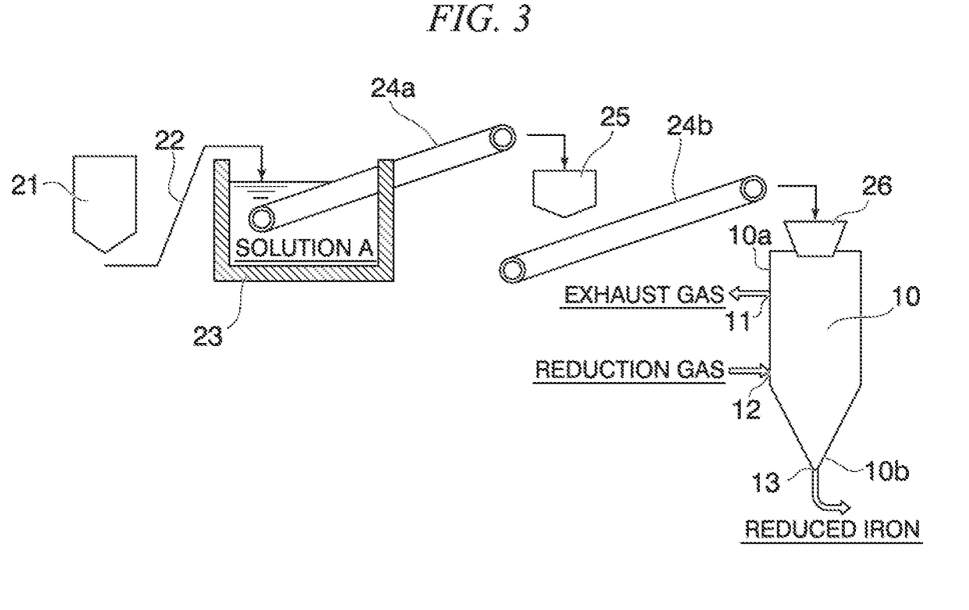
FIG. 3 is a schematic configuration view showing a process of producing a porously coated raw material.

Next, while referring to FIG. 3, a method for producing a porously coated raw material will be described. FIG. 3 is a schematic configuration view showing a process of producing a porously coated raw material. In a fired pellet tank 21 shown in FIG. 3, fired pellets which are the raw material 3 are reserved. On the lower side of the fired pellet tank 21, a charging conveyor 22 is provided. The charging conveyor 22 conveys the fired pellets supplied from the fired pellet tank 21 to a dropping position on the upper side of a coating treatment tank 23.

In the coating treatment tank 23, a slurry treatment solution A is reserved. As the treatment solution A, at least one hydroxide selected from a cement hydrate, calcium hydroxide ($Ca(OH)_2$), and magnesium hydroxide ($Mg(OH)_2$) can be used. That is, as the treatment solution A, any one of cement hydrate, calcium hydroxide ($Ca(OH)_2$), and magnesium hydroxide ($Mg(OH)_2$), or a mixture obtained by mixing at least two of these hydrates is used.

The fired pellets charged from the charging conveyor 22 into the coating treatment tank 23 are immersed (dipped) in the treatment solution A (corresponding to a coating process). Thus, coated pellets in which the periphery of the fired pellets is coated with the treatment solution A are obtained. In the embodiment, as a coating method of the fired pellets, an immersion method is used. However, the present invention is not limited thereto, and for example, a method of spraying can be adopted.

The coated pellets are conveyed to an evaporation furnace 25 by a conveying-out conveyor 24a. The evaporation furnace 25 heats the coated pallets by steam heating, electric heating, microwaves, an induced current or the like (corresponding to an evaporation process). The heating temperature of the evaporation furnace 25 is set to a temperature at which moisture (here, the moisture does not refer to combined water and refers to moisture adhering to the pellets in the coating process) in the coated pellets can evaporate (for example, 150° C.). The atmosphere in the evaporation furnace 25 does not include $CO_2$ gas. For example, gases such as an inert gas, air, a combustion gas which is subjected to a treatment of removing $CO_2$, heating steam, and the like, in which the amount of $CO_2$ is 1000 ppm or less, can be used as atmosphere gas in the evaporation furnace 25.

The coated pellets from which the adhering moisture is removed in the evaporation furnace 25 are conveyed out to a dehydration furnace 26 by a conveying-out conveyor 24b. The dehydration furnace 26 heats the coated pellets by exhaust gas sensible heat, electric heating, microwaves, a dielectric current or the like (corresponding to a dehydration process). The heating temperature of the dehydration furnace 26 is set to a temperature that is equal to or higher than the dehydration temperature of hydroxide included in the treatment solution A which becomes the coating layer 2. For example, when the treatment solution A includes calcium hydroxide ($Ca(OH)_2$), the heating temperature of the dehydration furnace 25 is set to a temperature at which a dehydration reaction of the following formula (1) is accelerated. When hydroxide (combined water) included in the treatment solution A is decomposed, the porosity of the coating layer 2 increases to 20 volume % or more, and the coated pellets becomes the porously coated raw material 1.

[Formula 1]

$$Ca(OH)_2 \rightarrow CaO + H_2O \qquad (1)$$

In the embodiment, the coated pellets are conveyed from the evaporation furnace 25 to the dehydration furnace 26 using the conveying-out conveyor 24b. However, the evaporation process and the dehydration process may be performed at the same time with one apparatus in which the evaporation furnace 25 and the evaporation furnace 26 are successively arranged.

In addition, the atmosphere in the dehydration furnace 26 does not include $H_2O$ steam. For example, gases such as an inert gas, a $H_2O$ removed air, a $H_2O$ removed combustion gas, gas obtained by combusting LDG, and the like, in which the concentration of $H_2O$ is 1% or less, can be used as, atmosphere gas in the dehydration furnace 26.

(Action and Effect of Decomposition Treatment of Hydroxide)

In the gas flowing in the furnace top 10a of the shaft furnace 10 (that is, exhaust gas), the concentration of $H_2O$ and the concentration of $CO_2$ are high. Thus, when the coated pellets are charged into the shaft furnace 10 as it is without evaporation of moisture and dehydration, hydroxide included in the treatment solution A which becomes the coating layer 2 reacts with $H_2O$ in the exhaust gas, the hydroxide is ionized, and a carbonation reaction proceeds by a reaction of the produced ions with $CO_2$. For example, when the treatment solution A includes calcium hydroxide $(Ca(OH)_2)$, carbonation reactions of the following formulae (2) to (4) are accelerated.

[Formula 2]

$$Ca(OH)_2 \rightarrow Ca^{2+}(aq) + 2(OH)^-(aq) \qquad (2)$$

[Formula 3]

$$CO_2 + H_2O + \rightarrow CO_3^{2-}(aq) + 2H^+(aq) \qquad (3)$$

[Formula 4]

$$Ca^{2+}(aq) + CO_3^{2-}(aq) \rightarrow CaCO_3 \qquad (4)$$

When the hydroxide is carbonated, the porosity decreases and the diffusion of the reduction gas into the raw material 3 are inhibited. Accordingly, before the coated pellets are charged into the shaft furnace 10, the moisture adhering to the coated pellets is evaporated and the coating layer 2 is heated at a heating temperature that is equal to or higher than the dehydration temperature of the hydroxide or higher after the evaporation. Then, carbonation after the coated pellets are charged into the shaft furnace 10 can be prevented.

That is, the porously coated raw material 1 provided with the coating layer 2 mainly containing at least one of an oxide of Ca and an oxide of Mg and having a porosity of 20 volume % or more is formed by heating the coating layer 2 at the heating temperature that is equal to or higher than the decomposition temperature of the hydroxide after the moisture adhering to the coated pellets is evaporated. When the porously coated raw material 1 is charged into the shaft furnace 10 as a raw material for direct reduction, the provided porosity does not decrease and thus the reduction disintegration of the raw material 3 can be sufficiently suppressed, That is, since the diffusion of the reduction gas into the raw material 3 is accelerated, the reduction disintegration of the raw material 3 can be suppressed.

The porously coated raw material 1 provided by the dehydration treatment is charged into the shaft furnace 10 from the furnace top 10a through a charging hopper that is provided between the dehydration furnace 26 and the shaft furnace 10. Accordingly, the raw material 3 is directly reduced so that reduced iron can be obtained from the bottom of furnace 10b.

Here, the porously coated raw material 1 is preferably charged into the shaft furnace 10 at a temperature which is equal to or higher than a temperature at the time of normal charging (for example, 25° C.). Accordingly, when the temperature of the porously coated raw material 1 before the raw material is charged into the shaft furnace 10 is lower than, for example, room temperature (25° C.), it is preferable that a preheating treatment is performed and then the raw material is charged into the shaft furnace 10. Since the preheating treatment is performed concurrently with the evaporation treatment and the dehydration treatment by heating, normally, there is no need to additionally perform the preheating treatment after the evaporation treatment and the dehydration treatment. However, for example, it is preferable to perform the preheating treatment under the condition that the temperature decreases due to a long conveying distance of the porously coated raw material 1.

On the other hand, when the temperature of the porously coated raw material 1 before the raw material is charged into the shaft furnace 10 is room temperature or higher, the raw material can be charged into the shaft furnace 10 as it is without the preheating treatment.

When a hydrogen rich gas mainly containing $H_2$ (for example, gas containing 50 volume % or more of $H_2$) is used as the reduction gas, an endothermic energy amount with reduction of $H_2$ is greater than the amount of heat generated with reduction of CO and thus reduction disintegration is likely to occur due to a decrease in the temperature. Here, when the temperature of the porously coated raw material 1 before the raw material is charged into the shaft furnace 10 is set to a fixed temperature or higher, the amount of heat sufficient for compensating the endothermic energy amount in the shaft furnace 10 can be supplied.

EXAMPLES

First Example

The porosity of a coating layer of dehydrated pellets obtained by thermally decomposing hydroxide of coated pellets, and the porosity of a coating layer of carbonated pellets obtained by carbonating coated pellets under a $CO_2$ atmosphere were investigated and compared with each other.

As a coating material, four kinds of cement having different particle sizes were used. The particle size of the cement particle was calculated by obtaining the specific surface area (Blaine Surface Area (BSA), which can be calculated by a method according to JIS R 5201) by an air permeability method. Coated pellets were formed by immersing iron oxide fired pellets (whose composition is shown in Table 1) having a diameter of 10.0 mm to 15.0 mm (an average particle size of 12.5 mm) in a treatment solution in which cement were formed into a slurry, coating the fired pellets with the solution, and drying the pellets for 24 hours. The coating layer amount of the coated pellets was 0.7 kg/t to 5.0 kg/t in terms of adhesion mass. That is, a value obtained by dividing the mass of the coating layer by the mass of the coated pellets was 0.7 kg/t to 5.0 kg/t.

TABLE 1

| | T·Fe | FeO | CaO | $SiO_2$ | $Al_2O_3$ | MgO | P |
|---|---|---|---|---|---|---|---|
| Fired pellets (mass %) | 68.2 | 0.14 | 0.1 | 0.4 | 0.4 | 0.1 | 0.02 |

These coated pellets were respectively thermally decomposed at 590° C. to form dehydrated pellets, or carbonated at 550° C. under a $CO_2$ atmosphere to form carbonated pellets. The porosity of the coating layer of each of the dehydrated pellets and the carbonated pellets was measured by image analysis.

Figure 4:
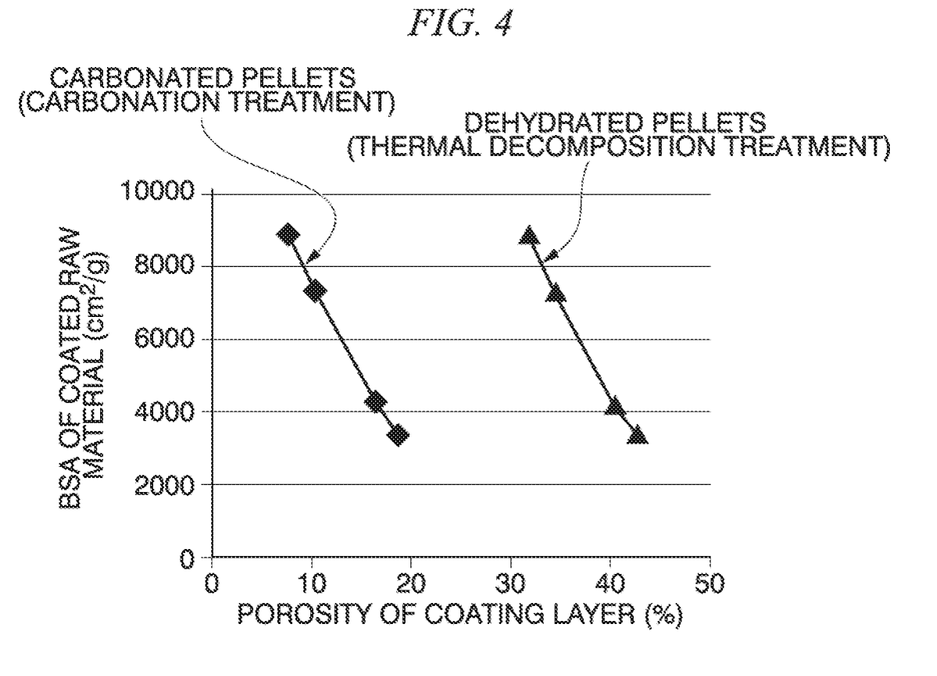
FIG. 4 is a diagram showing a relationship between the specific surface area (BSA) of a coating material and the porosity of a coating layer.

The measurement results are shown in FIG. 4. In the case of dehydrated pellets, irrespective of the particle size of cement, the porosity of the coating layer was 20 volume % or more. In addition, the smaller the value of the specific surface area of the coated cement was, that is, the coarser the particle size of cement was, the higher the porosity of the coating layer of the dehydrated pellets was. On the other hand, in the case of carbonated pellets, even when the particle size of cement particles was coarse, the porosity did not reach the target porosity, that is. 20 volume %.

Second Example

Pellets having a coating layer of a porosity of 20 volume % or more (corresponding to the porously coated raw material 1 of the above-described embodiment) were used as Example and fired pellets and pellets having a coating layer of a porosity of less than 20 volume % were used as Comparative Examples. A clustering test and a reduction disintegration test were performed thereon. In addition, the fired pellets were coated with a coating material to form coated pellets. The coated pellets were subjected to a dehydration treatment and hydroxide was decomposed to form dehydrated pellets. The fired pellets used were as the same as in the first example.

As the coating material, cement A having a specific surface area of 9650 cm$^2$/g, cement B having a specific surface area of 2580 cm$^2$/g, calcium hydroxide (Ca(OH)$_2$), and magnesium hydroxide (Mg(OH)$_2$) were used. The specific surface area of each cement was obtained by an air permeability method. The fired pellets were immersed in an aqueous solution obtained by dissolving the coating material to coat the entire periphery of the fired pellets with the cement, calcium hydroxide or magnesium hydroxide. The coating amount was unified to 0.5 kg/t. As the dehydration treatment when the dehydrated pellets were produced, a heat treatment was performed at a high temperature 50° C. higher than the decomposition temperature of each coating material for 3 hours using a box-like electric furnace.

Specifically, when the coating materials were the cements A and B, the heating temperature was set to 590° C., and when the coating material was calcium hydroxide (Ca(OH)$_2$), the heating temperature was set to 580° C. When the coating material was magnesium hydroxide (Mg(OH)$_2$), the heating temperature was set to 350° C. The coated pellets were dried at a heating temperature of 100° C. for 24 hours. The drying treatment is an evaporating only adhering moisture and is different from the above-described dehydration treatment. The porosity of the coating layer of the dehydrated pellets and the porosity of the coated pellets were measured by image analysis.

Each pellet of the above-described Examples and Comparative Examples was subjected to a clustering evaluation test and a reduction disintegration evaluation test to evaluate clustering and reduction disintegration. The clustering evaluation test was performed according to a test of ISO 11256 (2007). However, regarding the volume of a crucible, a test was performed based on test standards different from those of the test of ISO 11256 (2007). That is, a cylindrical crucible having a diameter of 45 mm was filled with a sample. The sample was reduced under predetermined reduction conditions, and then a load of 147 kPa was applied to the upper surface of the sample to further reduce the sample for 60 minutes. The sample after the reduction was rotated in a cylinder having a predetermined inner diameter size 35 times in total. The predetermined reduction conditions are such that rotation is performed for 60 minutes under the conditions that the reduction temperature is 850° C., the composition of reduction gas is CO: 30.0%, CO$_2$: 15%, H$_2$: 45.0%, and N$_2$: 10.0%, and the flow rate of reduction gas is 6 NL/min. Some pellets were disbanded from clustering. The samples disbanded from clustering every five time rotations were separated and the weight of the clustering was measured. Then, a clustering index: CI expressed by the following equation (5) was measured. As the value of CI decreases, clustering is less likely to occur in the furnace.

[Formula 5]

$$CI = \frac{100}{8m_r} \sum_{i=1}^{g} m_{c,i} \tag{5}$$

In the above equation (5), $m_r$ is the total weight of the sample after reduction and $m_{c,i}$ is the weight (g) of clustering in an i-th separation operation.

The reduction disintegration test method was performed according to ISO 11257 (2007). First, a sample was subjected to a reduction treatment by a method called a linder test. The linder test is a test in which under the reduction conditions that the reduction temperature is set to 760° C., the reduction time is set to 300 minutes, the composition of reduction gas is set to H$_2$: 55.0%, CO: 36.0%, CO$_2$: 5.0%, and CH$_4$: 4.0%, and the flow rate of reduction gas is set to 13 NL/min, the sample is charged into, a cylinder having a predetermined inner diameter followed by rotating for reduction. Next, the sample after the reaction was taken out and then sieving was performed to measure a ratio of particles passing through a 3.15 mm mesh sieve. The ratio was expressed as a reduction disintegration index (RDI). As the value of RDI decreases, reduction disintegration is less likely to occur in the furnace.

The test conditions and test results of the clustering test and the reduction disintegration test are shown in Table 2. In Table 2, regarding the values of CI and the values of RDI, a preferable result is denoted by "O" and an unpreferable result is denoted by "X".

In all dehydrated pellets 1 to 5, the porosity of the coating layer was more than 20 volume % Among coated pellets 1 to 5, only in the coated pellet 4 using the cement B in which the value of the specific surface area was small (that is, the particle size was coarse), the porosity was more than 20 volume %. In the coated pellets 1 to 5 and dehydrated pellets 1 to 5, the value of CI was decreased compared to the fired pellets. In addition, in Examples 1 to 6 having a coating layer of the porosity of 20 volume % or more, irrespective of dehydrated pellets or coated pellets, the value of RDI was small compared to coated pellets of Comparative Examples 1 to 4. From the above results, it was proved that pellets having a coating layer of a porosity of 20 volume % or more were effective to suppress clustering and reduction disintegration.

TABLE 2

| | | Coating material | Coating material BSA (cm$^2$/g) | Heating temperature (° C.) | Porosity of coating layer (volume %) | CI (mass %) | | RDI (mass %) | |
|---|---|---|---|---|---|---|---|---|---|
| Reference Example | Fired pellets | None | — | — | — | x | 81.2 | o | 1.0 |
| Comparative Example 1 | Coated pellets 1 | Cement A | 9650 | 100 | 5.8 | o | 22.1 | x | 3.0 |

TABLE 2-continued

| | Coating material | Coating material BSA (cm$^2$/g) | Heating temperature (° C.) | Porosity of coating layer (volume %) | | Cl (mass %) | | RDI (mass %) |
|---|---|---|---|---|---|---|---|---|
| Example 1 | Dehydrated pellets 1 | Cement A | 9550 | 590 | 30.2 | ○ | 22.4 | ○ | 1.7 |
| Comparative Example 2 | Coated pellets 2 | Ca(OH)$_2$ | 5100 | 100 | 14.6 | ○ | 17.5 | x | 2.5 |
| Example 2 | Dehydrated pellets 2 | Ca(OH)$_2$ | 5100 | 580 | 40.3 | ○ | 20.4 | ○ | 1.2 |
| Comparative Example 3 | Coated pellets 3 | Mg(OH)$_2$ | 4400 | 100 | 16.5 | ○ | 24.5 | x | 2.3 |
| Example 3 | Dehydrated pellets 3 | Mg(OH)$_2$ | 4400 | 350 | 42.4 | ○ | 23.2 | ○ | 1.1 |
| Example 4 | Coated pellets 4 | Cement B | 2580 | 100 | 20.2 | ○ | 25.3 | ○ | 1.9 |
| Example 5 | Dehydrated pellets 4 | Cement B | 2580 | 590 | 45.1 | ○ | 24.1 | ○ | 1.6 |
| Comparative Example 4 | Coated pellets 5 | Ca(OH)$_2$ + Mg(OH)$_2$ | 4790 | 100 | 15.2 | ○ | 20.9 | x | 2.5 |
| Example 6 | Dehydrated pellets 5 | Ca(OH)$_2$ + Mg(OH)$_2$ | 4790 | 580 | 41.1 | ○ | 21.5 | ○ | 1.2 |

Third Example

Figure 5:
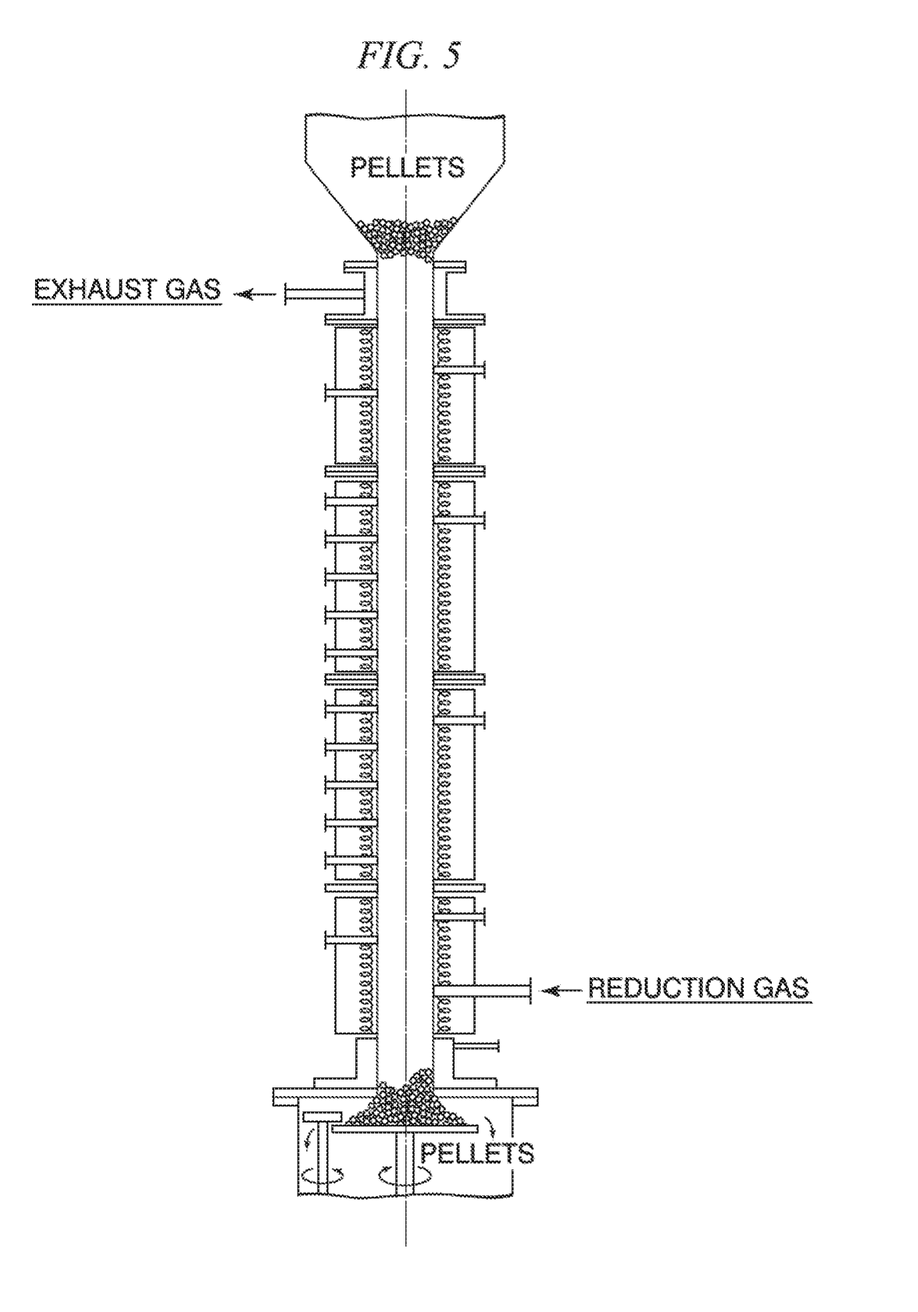
FIG. 5 is a schematic configuration view showing a small shaft furnace.

The reason why reduction disintegration is suppressed by charging a raw material into a furnace at a temperature higher than room temperature will be described in detail while referring to Examples. In the embodiment, fired pellets were used as a raw material. The average diameter of the pellets was 12.5 mm and the composition was as shown in Table 1. FIG. 5 shows a longitudinal sectional view of a small shaft furnace having an inner diameter of 0.1 m and a height of 4.0 m used in the embodiment.

A reduction gas having a gas composition of 70% H$_2$-20% CO-10% CO$_2$ at a gas flow rate of 300 NL/min was heated to 950° C. in a heating furnace and was introduced from a reduction gas introduction pipe in the bottom of the shaft furnace into the furnace. An ore hopper provided in the top of the shaft furnace was filled with about 300 kg of pellets which became a raw material and the pellets were charged into the furnace. A detection pipe for controlling temperature was provided in the small shaft furnace and the ore hopper, and the shaft furnace and the ore hopper were heated by electrical heating with two furnaces vertically divided by a kanthal resistance wire. Heat profiles in the furnace at a normal condition and at the condition of preheating the raw material were calculated by a mathematical model of the small shaft furnace and were set as heat profiles in the test. After preheating the gas heating pipe, the small shaft furnace, and the ore hopper at N$_2$ atmosphere, at the stage in which these temperatures reached 400° C., the discharging of the ore started. Thereafter, the charging and discharging of the ore and temperature rising were continued, and at the stage in which the temperature of the blowing gas reached 950° C., the gas was changed from N$_2$ gas to reduction gas. The test was continued until the temperature in the furnace became stable. After the temperature in the furnace became stable, the discharging of the ore and the blowing-in of the ore were suddenly stopped, N$_2$ gas was blown from the bottom of the shaft furnace, and the pellets in the furnace were cooled. After the cooling, the pellets were gradually discharged from the furnace bottom and a sample corresponding to the position of the height in the furnace was collected from the extracted volume. The sample was rotated and pulverized in a cylinder having a predetermined diameter and then sieved to measure the ratio of particles having a particle size of 3.15 mm or less. Thus, the degree of reduction disintegration was evaluated.

Figure 6:
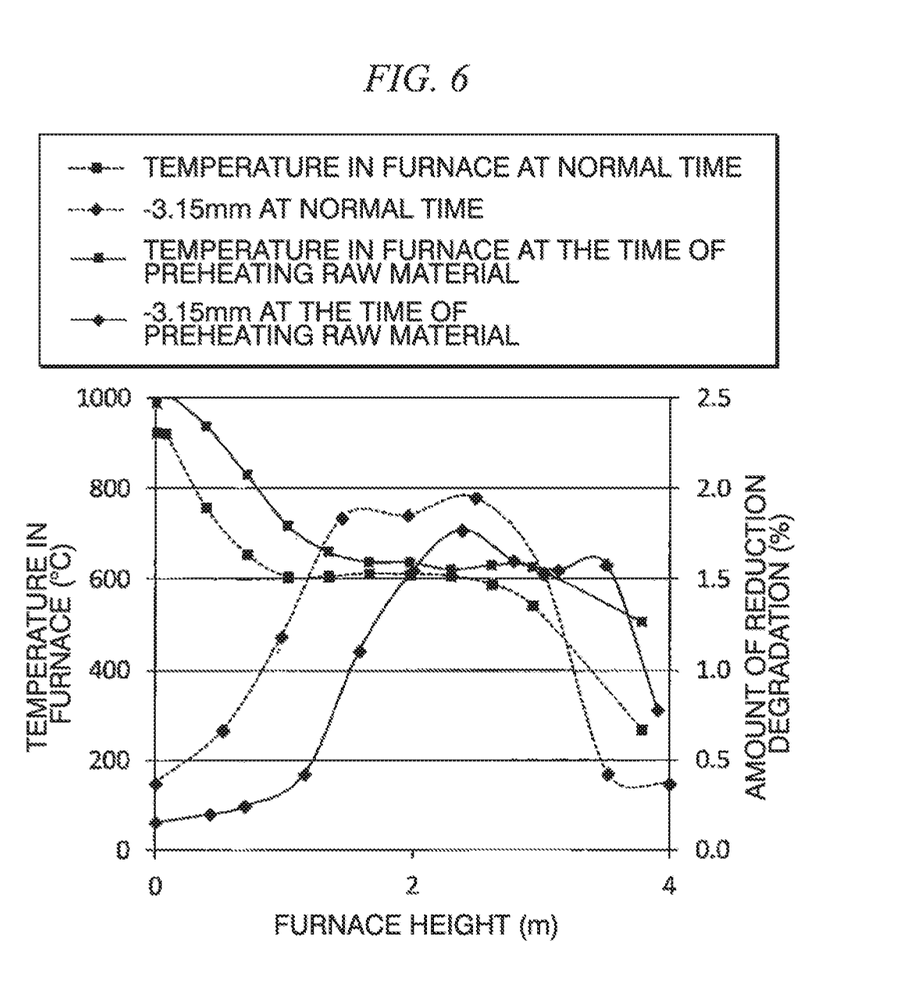
FIG. 6 is a diagram showing a relationship among a temperature in a furnace, furnace height, and an amount of reduction disintegration.

The test results are shown in FIG. 6. As compared with a normal time, the value of reduction disintegration at the time of preheating and charging was smaller than the value of reduction disintegration at a normal time. Further, a reduction disintegration occurrence zone was shifted to the furnace upper part in which the load of a charging material was small. Based on the test results, a reduction disintegration suppression effect by preheating and charging the raw material was confirmed.

INDUSTRIAL APPLICABILITY

According to the present invention, it is possible to provide a raw material for direct reduction in which clustering and reduction disintegration are less likely to occur.

BRIEF DESCRIPTION OF THE REFERENCE SYMBOLS

1: POROUSLY COATED RAW MATERIAL
2: RAW MATERIAL
3: COATING LAYER
10: SHAFT FURNACE
11: GAS OUTLET
12: GAS INLET
13: REDUCED IRON OUTLET
21: FIRED PELLET TANK
22: CHARGING CONVEYOR
23: COATING TREATMENT TANK
24a, 24b: CONVEYING-OUT CONVEYOR
25: EVAPORATION FURNACE
26: DEHYDRATION FURNACE

The invention claimed is:
1. A method of producing a material for direct reduction which is reduced in a shaft furnace, the method comprising:
    coating a processed product by immersing the processed product in a slurry containing one or more of calcium hydroxide, magnesium hydroxide, and cement hydrate, the processed product comprising one or more of an iron ore lump, a sinter, a pellet, and a briquette;
    evaporating moisture included in the coated processed product, by heating the coated processed product in an evaporation furnace, wherein an atmosphere in the evaporation furnace does not include $CO_2$, before charging the coated processed product into the shaft furnace; and after moisture is removed from the coated processed product, dehydrating combined water included in the coated processed product by heating in a dehydration furnace at a dehydration temperature or higher, using gas not including $H_2O$ steam, wherein a coating layer, formed on said material for direct reduction after said coating, evaporating and dehydrating, has a porosity of 20 volume % or more.

2. A method of producing a reduced iron, the method comprising:

charging the material for direct reduction produced by the method according to claim 1 into the shaft furnace at a temperature higher than room temperature, wherein the shaft furnace is a reduction furnace for producing reduced iron using reduction gas including hydrogen.

3. The method of producing a reduced iron according to claim 2, further comprising:

preheating the material for direct reduction to the temperature higher than room temperature before charging the material for direct reduction into the shaft furnace.

* * * * *